Sept. 16, 1969  YOSHIO WARIDE  3,467,561

METHOD OF JOINTING INSULATED ELECTRIC WIRES

Filed June 23, 1965

INVENTOR.
YOSHIO WARIDE
BY
*Carothers & Carothers*
HIS ATTORNEYS 3,467,561
METHOD OF JOINTING INSULATED ELECTRIC WIRES
Yoshio Waride, Daito, Japan, assignor to Sumitomo Electric Industries, Ltd., Osaka, Japan, a corporation of Japan
Filed June 23, 1965, Ser. No. 466,328
Claims priority, application Japan, June 29, 1964, 39/37,130
Int. Cl. H01b *13/08*
U.S. Cl. 156—49                                           5 Claims

ABSTRACT OF THE DISCLOSURE

The method of insulating conductor joints for insulated cables by applying a first winding of heat fusible synthetic plastic tape over the joint and a second winding of substantially transparent sintered tetrafluoroethylene tape and heating the windings for unification while observing the interior for character of finish.

---

The present invention relates to a method of jointing and terminating an electric conductor with a tape of polyethylene, or uncrosslinked polyethylene, or irradiated polyethylene, or the like, which tape is wound over the conductor joint of polyethylene or crosslinked polyethylene cable insulation and the sintered tetrafluoroethylene tape is further wound over said wound tape, with subsequent heating.

The method of jointing polyethylene or crosslinked polyethylene cables heretofore employed is one in which the tape of polyethylene or irradiated polyethylene is wound over the conductor joint and insulation, then cellophane tape or rubber tape, cotton tape, glass tape, etc. is further wound over said winding, and heat is thereafter applied by means of an electric heating wire, metal mould, steam, etc. However, this prior method heretofore employed has such drawbacks as mentioned hereinafter.

If cellophase tape is used, it becomes scorched when heat is applied. If rubber tape or cotton tape, glass tape, etc. is used, the interior of the joint part cannot be seen, so that it is impossible to see voids, separation of layers, etc. that may occur therein. Furthermore, the appearance of the finished joint is not very good. On the other hand, if a metal mold is used at the time of heating, the joint part cannot be seen so that it is impossible to judge whether the job is being done properly or not. Furthermore, the apparatus for heating by electrically heated wire, metal mold, steam, etc. is expensive and is not suitable for field work.

The greatest defect of the prior method is that polyethylene or crosslinked polyethylene may have separation of layers or voids taking place under some temperature conditions, so that the electrical properties of the finished joint vary greatly. This is because of the fact that the condition of the interior of the joint part cannot be seen.

The present invention furnishes a method of jointing insulated electric wires which is free from the above-mentioned shortcomings.

The first characteristic of the present invention is that insulating plastic tape is wound over the conductor joint part and also on the polyethylene or crosslinked polyethylene insulating the cable, sintered tetrafluoroethylene tape is then wound over the same and the wound joint is finished by the application of heat to the same.

Another characteristic of the present invention is that polyethylene tape is wound over the conductor joint part of polyethylene or crosslinked polyethylene insulated cable, sintered tetrafluoroethylene tape is further wound over the same and is heated to unify the same.

Still another characteristic of the present invention is that uncrosslinked polyethylene tape is wound over the conductor joint part of polyethylene or crosslinked polyethylene cable, and then sintered tetrafluoroethylene tape is further wound over the first tape winding and the wound joint is thereafter heat treated.

Still another characteristic of the present invention is that irradiated polyethylene tape is wound over the conductor joint part of polyethylene or crosslinked polyethylene cable, and then sintered tetrafluoroethylene tape is further wound over the wrapped joint which is then heat treated.

Another characteristic of the present invention is that said heating is done by means of a windowed metal pipe.

Other objects and advantages appear hereinafter in the following description and claims.

The accompanying drawings show for the purpose of exemplification without limiting the invention or claims thereto, certain practical embodiments illustrating the principles of this invention wherein:

Figure 1:
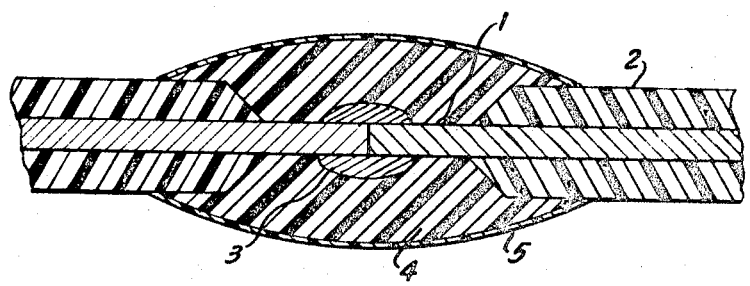
FIG. 1 is a directional view of cable ends joined together and covered with insulation.

FIGURE 1 shows the conductor joint part of polyethylene or crosslinked polyethylene cable for 6 kv. or lower voltage classes, in which 1 denotes the cable conductor, 2 the joint part of penciled sharpened cable insulation of polyethylene or crosslinked polyethylene, and 3 the jointing sleeve. Over them is wound a heat fusible synthetic plastic tape such as the polyethylene or uncrosslinked polyethylene or crosslinked polyethylene tape 4, and is further wound sintered tetrafluoroethylene tape 5 having a thickness of about 0.1 mm. Then they are heated for about 30 minutes at a temperature in the neighborhood of 185° C. by directly blowing them with hot air as from an instrument somewhat like a powerful hair drier or by means of a gas burner, propane gas burner, torch lamp, etc.

Figure 2:
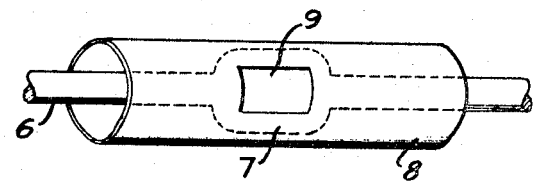
FIG. 2 is a perspective view in side elevation showing a tube with a window for observing a taped sealed joint.

FIGURE 2 is a side view of the windowed metal pipe, the metal pipe 8 with the window 9 to view the wrapped joint such as shown in FIG. 1. The pipe 8 is of the split type being applied to the conductor joint part 7 of the cable 6 and heated from outside to internally heat treat the wrapped joint by applying a flame directly on the metal pipe while observing the wrapped joint through the window 9. The pipe 8 may also be heated by other means such as heated insulating wire wound thereon. When the joint is finished by this heat treatment, the split pipe 8 may be removed. The broken lines in FIGURE 2 indicate the cable joint shown in FIGURE 1.

The reasons why sintered tetrafluoroethylene tape is used in this invention are that it has good resistance to heat and to thermal deformation and consequently provides a protective layer and that it has good thermal conductivity and consequently prevents heating from being localized. Furthermore, sintered tetrafluoroethylene tape is transparent so that it is possible to carry on the operation while observing the condition of the winding of polyethylene, uncured polyethylene, or irradiated polyethylene in the interior at the time of heating with respect to melting, softening, voids and bonding of layers. Moreover, as it has good mechanical properties, it tightens the layer of polyethylene or crosslinked polyethylene which has expanded upon heating and produces a beautifully finished surface.

An example of experiment on the present invention is shown below.

6 kv. 100 mm.² crosslinked polyethylene cable
Tetrafluoroethylene tape thickness 0.1 mm. x width 20 mm.
One sheet ½ overlap winding
Heated by a gas burner.

The results are:

[AC long time breakdown value (the voltage is raised by steps of 5 kv. for 30 minutes after initial charging with 20 kv. for 30 minutes)]

| | | | | |
|---|---|---|---|---|
| No. 1 | 65 kv. | 13 min. | Cable end breakdown | ⎫ Heated by gas burner from outside via aluminum pipe. |
| No. 2 | 80 kv. | 5 min. | do | ⎭ |
| No. 3 | 50 kv. | 20 min. | Cable breakdown | Directly heated by gas burner. |

In case the winding is made with a self-fusing tape as in the past, the value is usually 40 kv. or so. In the case of the present invention, breakdown has not taken place at the joint in any instance.

As already stated, sintered tetrafluoroethylene tape is used and direct heating made or heating is made via the windowed metal pipe when the method of the present invention is employed, so that heating can be carried out while observing the condition of the interior. This makes it possible to prevent the separation of layers and the creation of voids. On the other hand, the use of sintered tetrafluoroethylene tape which has a good resistance to heat and to thermal deformation and which is mechanically strong has a good tightening effect and produces a smoothly finished surface and a beautiful appearance. Furthermore, no special tools and materials are required for the heating, so that the method is suitable for field work. It also has an advantage that the method is easy to carry out where the joint is not round, but is a sector for example.

Needless to say, the present invention is applicable not only to the jointing of insulated electric wires as already mentioned but also to the terminating, by making a terminal stress cone by the above-described method.

I claim:

1. The method of insulating conductor joints for synthetic plastic insulated electric conductors comprising the steps of applying wraps of insulating heat fusible synthetic plastic tape over the conductor joint, applying over the first tape winding a second winding of sintered tetrafluoroethylene tape which is substantially transparent at least upon the application of heat, and heating the wraps of tape to unify the same while observing the first tape winding through the transparent second winding of tape to determine the degree of finish of the insulation molding.

2. The method of claim 1 wherein the conductor insulation is polyethylene or crosslinked polyethylene and the heat fusible synthetic plastic tape employed for the first winding is a polyethylene tape.

3. The method of claim 1 wherein the conductor insulation of polyethylene or crosslinked polyethylene and the heat fusible synthetic plastic tape employed for the first winding is an uncrosslinked polyethylene tape.

4. The method of claim 1 wherein the conductor insulation is polyethylene or crosslinked polyethylene and the heat fusible synthetic plastic tape employed for the first winding is an irradiated polyethylene tape.

5. The methods of claims 1, 2, 3 or 4 which also include the step of positioning a windowed metal tube over the wound conductor joint for the application of heat thereto in accordance with the step of heating the wraps of tape.

References Cited
UNITED STATES PATENTS

| | | | |
|---|---|---|---|
| 2,406,127 | 8/1946 | Alfthan | 264—118 |
| 2,941,911 | 6/1960 | Kumnick et al. | 156—86 |
| 2,993,820 | 7/1961 | Marshall | 156—56 |
| 3,033,727 | 5/1962 | Cram et al. | 156—56 |
| 3,159,513 | 12/1964 | Baier | 156—49 |
| 3,223,564 | 12/1965 | Buschman et al. | 156—53 |
| 3,225,129 | 12/1965 | Taylor et al. | 156—86 X |
| 3,356,551 | 12/1967 | Glenn | 156—49 |

EARL M. BERGERT, Primary Examiner

T. R. SAVOIE, Assistant Examiner

U.S. Cl. X.R.

156—56, 86; 174—21